United States Patent [19]
McCarthy et al.

[11] Patent Number: 6,026,961
[45] Date of Patent: Feb. 22, 2000

[54] COMPUTER CORD STORAGE AND DISPENSING ORGANIZER AND SYSTEM

[75] Inventors: Christine Noel McCarthy; Thomas Edward George Hale, both of San Francisco, Calif.

[73] Assignee: Cordpack Incorporated, San Francisco, Calif.

[21] Appl. No.: 09/098,033

[22] Filed: Jun. 15, 1998

[51] Int. Cl.[7] .................................................. B65D 81/00
[52] U.S. Cl. ........................... 206/576; 206/320; 206/702
[58] Field of Search ..................................... 206/320, 305, 206/701, 576, 702

[56] References Cited

U.S. PATENT DOCUMENTS

| | | |
|---|---|---|
| 2,068,547 | 1/1937 | Jung . |
| 2,167,926 | 8/1939 | Glasher . |
| 2,299,673 | 10/1942 | Zolkind . |
| 2,554,215 | 5/1951 | Schell et al. . |
| 2,674,288 | 4/1954 | Laidlaw . |
| 3,023,794 | 3/1962 | Lifton . |
| 3,154,125 | 10/1964 | Harvey . |
| 5,457,600 | 10/1995 | Campbell et al. . |
| 5,596,479 | 1/1997 | Campbell et al. . |
| 5,598,921 | 2/1997 | Hunt . |
| 5,669,571 | 9/1997 | Graybill . |
| 5,670,989 | 9/1997 | Owen . |
| 5,808,865 | 9/1998 | Alves ................................... 206/305 X |

*Primary Examiner*—Jacob K. Ackun
*Attorney, Agent, or Firm*—Thomas W. Cook

[57] ABSTRACT

A computer cord storage and dispensing organizer pack and system for securing and organizing cords, connectors, lines, power supply, computer mouse, and other equipment is disclosed, the pack being small enough for insertion into a laptop computer carrying case, the pack having pockets for gathering computer equipment, the pockets of the pack having apertures or channels for cords to extend, the pockets and channels being optimized to create an efficient cord interface between pack and computer, and a compact holder during travel, thereby reducing tangle, setup time, loss of components, and damage to equipment.

11 Claims, 3 Drawing Sheets

FIGURE 3 A.
FIGURE 3 B.
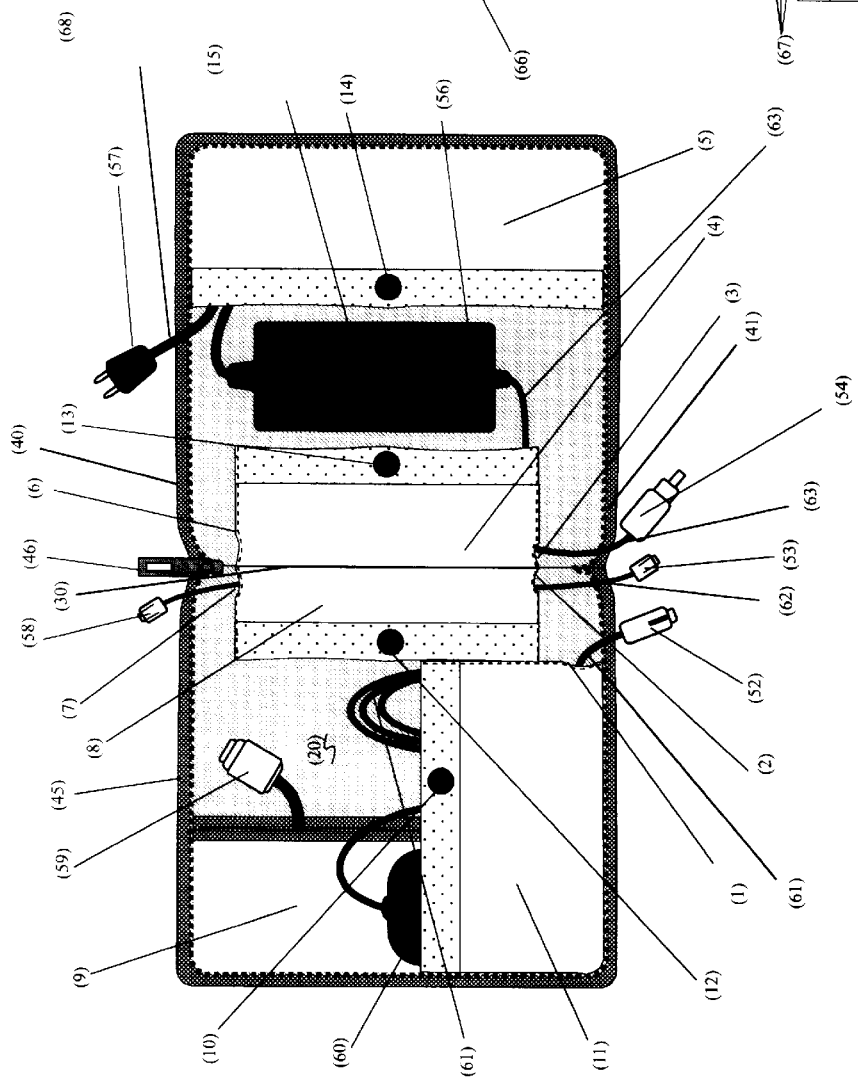
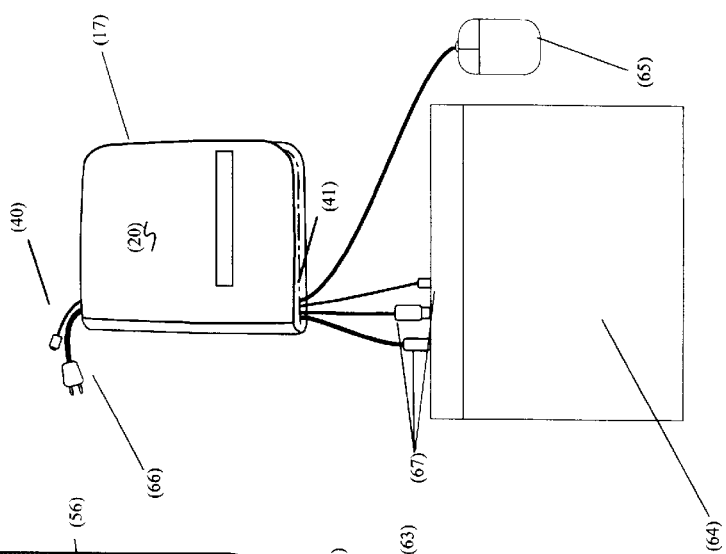

COMPUTER CORD STORAGE AND DISPENSING ORGANIZER AND SYSTEM

TECHNICAL FIELD OF THE INVENTION

The present invention relates to cord storage and organizing. More particularly, the present invention relates to a new cord storage and organizing assembly and system for use in conjunction with a laptop computer and standard computer laptop carrying cases and bags.

BACKGROUND ART OF THE INVENTION

In recent years, "laptop," "notebook," and similar compact computers, have become extremely popular. Computer users have found that they may transport such computers, along with associated peripherals, connectors, converters, and similar equipment, to establish a temporary, but functional, office virtually anywhere. Laptops and notebooks are also used effectively in more usual office environments as a computer user's only computer.

One problem with traveling with a laptop computer, however, is the storage, setup, and breakdown of a power converter, a telephone line, a mouse, and various cords and other items which connect components necessary to operate the computer, or otherwise facilitate its use, at one's destination (such cords, lines, power supply, mouse, and other equipment may be referred to herein collectively as the computer "associated equipment"). Conventional laptop computer carrying cases and bags often have pockets for carrying associated equipment, but the pockets are simply places to store, and provide no assurance that one or more cords, a power supply, a mouse, or other item, will not be left behind after use, or lost during travel. Further, the pieces of associated equipment often press against each other and the laptop computer while in transit, resulting in breakage of items, and possible loss of operability.

Another problem with traveling with a laptop computer is the time and effort of organizing associated equipment prior to use, and keeping such equipment organized during use. Typically, a laptop user will unpack associated equipment at the time the laptop is pulled from its carrying case. In such unpacking, however, separate pockets must often be unzipped, the components handled individually, a power source and telephone line located, power cord and other lines untangled, and individual components plugged into each other, the power source, and a telephone jack. The associated equipment, particularly the cords, are then bundled or otherwise organized to remove them, to the extent possible, from the work space. The unpacking of a laptop is therefore time consuming, as each item of associated equipment must be located, lines untangled, connectors located and matched with connecting points, and the associated equipment organized around the laptop. The resulting configuration of computer associated equipment is often tangled, unsightly, and confusing. When the user is finished working, the unpacking is reversed. Cords must be coiled or folded, a place found for each component of the associated equipment, and equipment placed or stuffed into the place chosen, each time the user changes location.

Another problem with traveling with a laptop computer is the bulk of associated equipment. Since a user does not know the location of a power source or telephone jack prior to setup, or where a power source and telephone jack will lie in relation to the jacks in the laptop, long cords are often supplied to fit all possible configurations, and additional space is required to store and manage the longer cords.

DESCRIPTION OF THE PRIOR ART

The use of cord storage and dispensing organizers for cords and computer equipment of various designs and configurations is known in the prior art. Such designs include:

U.S. Pat. No. 5,669,571 to Graybill, which discloses a spring-wound, modular arrangement for holding cords used with a desktop computer.

U.S. Pat. No. 5,670,989 to Owen, which discloses a spring-loaded computer "mouse" cord organizer.

U.S. Pat. No. 5,398,895 to Whetherhult, which discloses a second spring-loaded computer "mouse" cord organizer.

U.S. Pat. No. 5,598,921 to Hunt, which discloses a multi-functioned plastic computer workplace organizer.

U.S. Pat. No. 5,596,479 to Campbell, which discloses a computer power switching device with cord storage bays.

Japanese Patent Number 8,110,834, which discloses computer "mouse" with cord housing capability.

U.S. Pat. No. 3,626,495 to Bastian, which discloses a device for storing extension wires used with electrical appliances.

A number of other patents relate to various line storage, organizing, and connecting inventions designed to hold power cords, such as that found in U.S. Pat. No. 4,921,444 to Cama, U.S. Pat. No. 4,285,486 to Von Osten, U.S. Pat. No. 4,149,765 to Mortelmans, U.S. Pat. No. 5,075,932 to Hunt, U.S. Pat. No. 4,101,089 to Culbertson and Klucznik, and U.S. Pat. No. 4,354,650 to Lowder, and a number of other patents relate to cord or wire storage and organization more generally, such as that found in U.S. Pat. No. 4,772,220 to Hallier, and U.S. Pat. No. 4,586,675 to Brown.

While the devices disclosed in these prior patents fulfill their respective objectives, these prior patents do not describe or suggest a device for storing, carrying, or organizing cords, and virtually all other computer associated equipment necessary to operate a computer, resulting in a system for reducing setup and packing time, reducing space and bulk during travel and use, organizing computer cords and associated equipment to eliminate tangle and mess and reduce cord and connector management, and insuring all associated equipment is included in packing and moving a computer while no associated equipment is misplaced or damaged.

In this respect, the carrier and system of the present invention substantially departs from pre-existing designs of the prior art, and in so doing provides the user with a means for accomplishing all of the above tasks in a single unit, which unit is designed to rest close to the computer with which the unit coacts, and which unit has pockets for holding computer associated equipment during travel, and storing excess cords and connectors while in use By using the invention disclosed herein, the user thereby gains the highly desirable abilities to move a computer quickly and efficiently, to set up and maintain a computer with minimum disarray and confusion, and to reduce the risk of damage or loss of components which might make the computer inoperable.

DISCLOSURE OF INVENTION

SUMMARY OF THE INVENTION

The present invention overcomes the problems and disadvantages of the prior art by allowing users to carry all computer associated equipment in a single container, or "encapsulated" unit, and deploy the associated equipment quickly and efficiently, in an orderly and organized configuration, and maintain order among such equipment, with minimum risk of loss or damage. These benefits are afforded the user of the present invention throughout all phases of use, i.e., while traveling with a computer, while packing of the computer and associated equipment for travel and unpacking at a new location, and while working on the computer.

Specifically, the new organizing device and system of the present invention comprises, in one preferred embodiment, a flexible, strong, resilient fabric pack, to which are attached pockets, with closures, and separate outlets or apertures from such pockets, such outlets sometimes called herein individually a "cord channel," and collectively "cord channels," through which outlets or apertures the cords and other connectors utilized in running the computer may exit. The pockets in such preferred embodiment are designed to hold each component necessary to computer operation, each pocket being sized to hold a separate component of standard size. For example, the pocket intended to hold a computer "mouse" is formed just large enough to hold a mouse of standard size. The means of attachment is by sewing, in one preferred embodiment, but the attachment of pockets may utilize any means commonly found in the construction of backpacks and luggage.

The pack of the present invention, in one preferred embodiment, may be folded approximately in half, and secured in such position by zippers, buttons or other fasteners, thereby creating a fully closed bag, with a spine created along the fold line. However, the pack of the present invention may also be only partially closed, or left open entirely, thereby allowing cords or connectors to extend from the bag toward a computer, wall outlet, or telephone jack. While a preferred embodiment of the present invention is formed of flexible fabric, the idea embodied is not so omitted. For instance, the pack may also be formed of metal or other hard material.

The pack of the present invention, in one preferred embodiment, is sized so that it may, when folded approximately in half, be placed within one compartment of a laptop computer carrying case or bag of standard size. As a result, a user may retract all the cords and connectors associated with a single computer into the pack, fold the pack into its closed position, and conveniently slip the pack into one computer carrying case compartment. Since the pack of the present invention, in one preferred embodiment, is formed from flexible fabric, the pack as a whole may give a bit to fit within a computer case compartment if the compartment is somewhat irregularly shaped, or even if the compartment is slightly smaller than the fully extended dimensions of the pack. Moreover, the pack of the present invention, in one preferred embodiment, may be formed by attaching two flexible layers of fabric to each other so as to leave a space therebetween. Within such space may be fitted additional padding, which may serve to provide additional protection for the more fragile components held in the pack while traveling.

The pockets of the present invention are organized and positioned on the main body of the pack so as to result in a compact arrangement of pockets, within which some or all components necessary to computer operation may be placed. The position, size and spacing of pockets allows each component to ride within the bag formed when the invention is closed without positioning the components so as to increase the overall thickness of the bag. Thus, when the invention, in one preferred embodiment, is in its folded configuration, the computer "mouse" is placed along one edge of the resulting bag, directly inside a zipper holding the bag closed, while the power converter is placed in the middle of the bag. In such configuration, the mouse and power converter sit beside each other, rather than on top of one another, thus reducing the thickness of the bag overall.

The pockets of the present invention are positioned, sized and spaced to allow each component to reside as close as possible to the computer, with the cable or connector of each component arranged to lead conveniently through the cord channel, if any, of the pocket holding that component. The arrangement of cord channels from each pocket directs the cord or connector of each component toward one side of the pack or the other, approximately at the center fold line of the pack. Moreover, the ends of cords or connectors which are intended to attach to the computer are directed by the cord channels of their respective pockets to lead to one side of the invention, while the ends of cords or connectors which are intended to run to a wall power outlet or telephone jack are directed by the cord channels of their respective pockets to lead to the other side of the invention, or are simply allowed to exit the pack without passing through a cord channel.

Since all cords and connectors to be connected to the computer extend from about the middle of the pack on the side of the pack facing the computer, the arrangement of pockets and cord channels allows the user to reduce and fix the length of cords and connectors extending from the pack to the computer, and therefore the distance between these components. Since all cords and connectors to be connected to a power outlet or telephone jack extend from about the middle of the pack on the side facing the wall, the arrangement of pockets and cord channels allows the user to easily manage power and telephone cords by gathering and extending them only so far as is necessary in a suitable direction for engagement with wall outlets and telephone jacks.

The cord channels of the present invention, in one preferred embodiment, are separately formed from elastic material sewn or otherwise fastened to the pockets from which cords may emerge. In other embodiments the cord channel may simply be an outlet from the pockets left between the pockets and the main body of the pack during manufacture. In either event, the cord channels are best formed so as to allow elastic contraction around the cord or connector intended to pass through the channel, so that the channel snugly fits around each cord or connectors. The user may thereby extend cords and connectors only so far as is necessary to utilize each cord, and secure the cord or connector in such position during use of the computer.

The arrangement of pockets and cord channels allows the user to leave components of the associated equipment, and much of the length of the cords and connectors, within the pockets of the invention before, during, and after the user sets up and uses his computer. During use, the user may extend the leads of the cords and connectors from the cord channels in the pack to the computer or, to the extent necessary only, from the pack to wall outlets and jacks. Because the cords may be firmly held by the cord channels, the cords and connectors may be maintained in these optimal positions for the duration of work on the computer. By keeping components together and cords folded, coiled or gathered in the pockets of the pack of the present invention, the user keeps all components and cords bundled and organized, and reduces the free length of cords and connectors outside the pack.

The arrangement of pockets and cord channels in the present invention also allows the user to easily fold the present invention back into its closed position, or fold the invention and stand it on one end, thereby reducing the space required to hold the invention on a desktop, while leaving only the ends of the cords and connectors necessary to operate the computer open to view, or available for connection to computer or wall.

The arrangement of pockets and cord channels of the present invention also allows the user to easily fold the invention approximately in half, because the pockets and cord channels along the length of the fold line contain only flexible cords and connectors, and not bulky or rigid computer associated equipment. In one preferred embodiment of the invention, the cords running through pockets and cord channels substantially along the fold line of the pack include the end of a power cord which extends from a power converter to the computer, and all or almost all of a telephone line. These cords and connectors at the fold line of the invention may extend from side to side across the invention, and beyond to their respective connections when in use. However, these cords and connectors may also be retracted back into their respective pockets when not in use, and flexibly bent or pushed into position within their pockets when the invention is folded. As a result, the invention may be easily folded notwithstanding the presence of the cords and connectors at the fold line of the pack.

The pockets and cord channels of the present invention may be made of either stretchable or non-stretchable fabric, or of non-stretchable fabric with stretchable and resilient tops. Stretchable tops may in fact act as the closure for each of the pockets, thereby eliminating the need for separate closures. In the alternative, the closures may be of any known type, including zippers, buttons, or hooks. Moreover, while most cords and connectors are generally better contained within pockets, some components, such as the power converter, may be attached more simply with rubber straps, clips or, as in one preferred embodiment, a clasping material such as that known as "velcro."

In accordance with the purpose of the present invention, as embodied and broadly described herein, the invention relates to a method, system, or process for enabling a user to maintain organization and control of the associated equipment of a laptop or other computer, comprised of:

(i) packing the cords and connectors associated with a single computer upon or within pre-determined areas, pockets, or other holders situated on a single organizing unit as described herein, (ii) maintaining components and excess lengths of cords within that organizing unit while traveling, and while working on the computer, (iii) gathering cords and connectors into a manageable group, by feeding cords and connectors through cord channels sized firmly hold the cords, and formed within pockets attached to the organizing unit, which pockets hold excess cords and connectors, (iv) extending cords and connectors from the pockets or cord channels of the organizing unit, through the appropriate pockets or cord channels, to the computer a minimum, fixed, distance from one side of the pack, (v) extending cords and connectors from the pockets or cord channels of the organizing unit, through other appropriate cord channels, an indeterminate distance to receptacles for power and telephone service, on the other side of the pack, (vi) working with the organizing unit positioned close to the computer, the cords and connectors extending from the computer, through various pockets or cord channels of the organizing unit, and to such receptacles, while maintaining other computer associated equipment within the pockets or channels of the single organizing unit, (vii) retracting cords, connectors, and other associated equipment into the organizing unit after work is complete, to the same pre-determined areas, pockets, or other holders from which the associated equipment was taken prior to use, (ix) closing the organizing unit and, (x) in some cases, inserting the organizing unit into an appropriate compartment of a computer traveling case for travel to another location.

The more important features of the invention have thus been outlined, rather broadly, so that the detailed description thereof that follows may be better understood, and in order that the present contribution to the art may be better appreciated. Additional features of specific embodiments of the invention will be described below.

However, before explaining preferred embodiments of the invention in detail, it may be noted briefly that the pack of the present invention provides the opportunity to maintain all cords, connectors, and computer associated equipment in an orderly and organized configuration throughout all phases of packing, using, and unpacking for use of a computer, and all its associated equipment. This is accomplished through the expedient of securing all associated equipment to the pack or within pockets attached to the pack to keep all equipment in one place and organized, the pockets arranged on the pack to set the position of each piece of associated equipment, and providing cord channels of appropriate size for quick and easy access to, while securely holding, cords and connectors to reduce and pre-define the distance between the pack and the computer. The flexible pack of the present invention allows a user to maintain the organization of all computer associated equipment, and quickly and efficiently set up and break down a computer for pleasant, efficient travel from place to place, without fear of loss or damaged equipment. Such advantages have not been hitherto available to users.

OBJECTS OF THE INVENTION

The principal object of the present invention is to provide a new device for organizing, transporting, and maintaining the organization of cords, connectors, and other equipment associated with a computer.

A further principal object of the present invention is to provide a new system for organizing and maintaining the organization of cords, connectors, and other equipment associated with a computer.

A further principal object of the present invention is to provide a new device and system for managing cords and connectors used with computers by setting a location for each piece of associated equipment within a single unit, providing set "cord channels" for easy access to cords and connectors, and reducing and fixing the length of cords and connectors extending from the pack to the computer, to thereby reduce the distance between these components.

A further object of the present invention is to provide a new device and system for minimizing the number of items to consider when packing and unpacking a computer upon moving it, by reducing the amount and number of cords, connectors and associated equipment to a single unit, which may be used to encapsulate all of the associated equipment necessary to utilize the computer.

A further object of the present invention is to provide a new device and system for organizing computer associated equipment in a flexible pack of proper size, for easy insertion of the pack, and all components contained therein, into a standard-size computer case or bag.

A further object of the present invention is to provide a new device and system for eliminating loss of components.

A further object of the present invention is to provide a new device and system for protecting all components in a flexible, perhaps padded, pack.

BRIEF DESCRIPTION OF DRAWINGS

The accompanying drawings, which are incorporated in and constitute a part of this specification, illustrate one embodiment of the invention and, together with the description, serve to explain the principles of the invention.

FIG. 3A is a plan view of a first preferred embodiment of the present invention in an open configuration, with typical computer equipment within the pockets.

FIG. 3B is a perspective view of a first preferred embodiment of the present invention in a closed configuration, along with a computer to which cords in the invention are plugged.

DESCRIPTION OF A PREFERRED EMBODIMENT

Figure 1A:
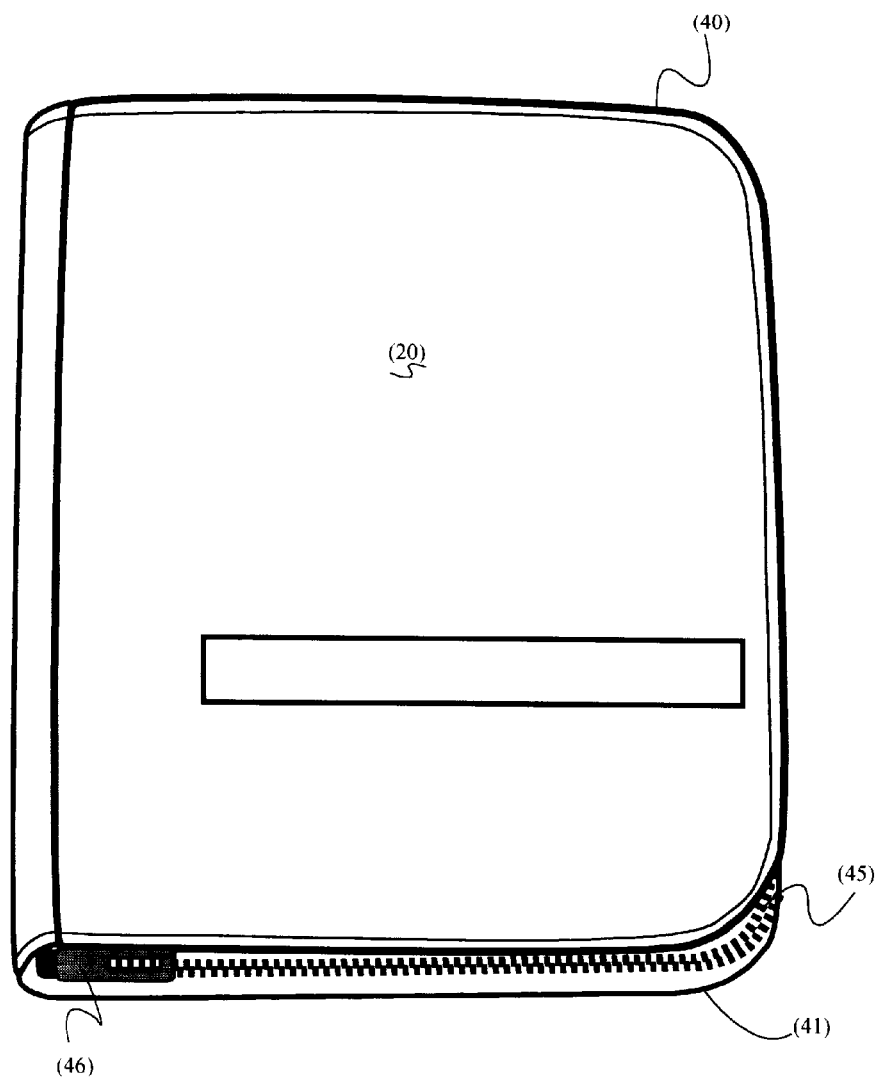
FIG. 1A is a perspective view of a first preferred embodiment of the present invention in a closed configuration.
Figure 1B:
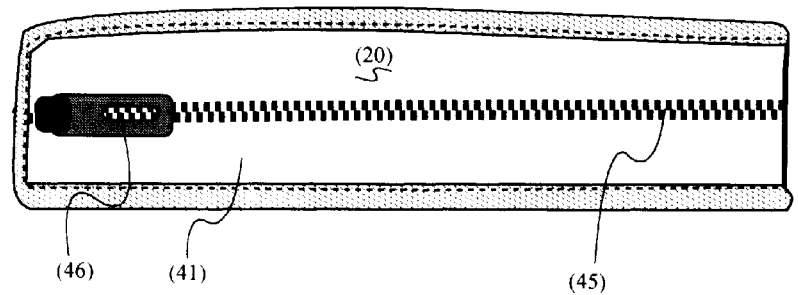
FIG. 1B is an end view of a first preferred embodiment of the present invention in a closed configuration, viewed from the bottom edge.

Referring initially to FIG. 1A, the new storage and organizing assembly and system pack 20 constructed in accordance with the principles of the present invention is shown, in one embodiment, in its closed configuration, as it would be configured when folded during travel. The pack in FIG. 1A has a top edge 40, and a bottom edge 41. The bottom edge 41 of the pack 20 shows a zipper 45 with zipper clasp 46, which zipper, as shown in subsequent drawings, runs around all edges of the pack. In FIG. 1B, the pack 20 is shown bottom edge on, the detail of the zipper 45 and zipper clasp 46 being apparent. The overall dimensions of this preferred embodiment of the present invention, when folded, are approximately 10¼ inches long by approximately 9⅝ inches wide by approximately 1¾ inches deep.

Figure 2:
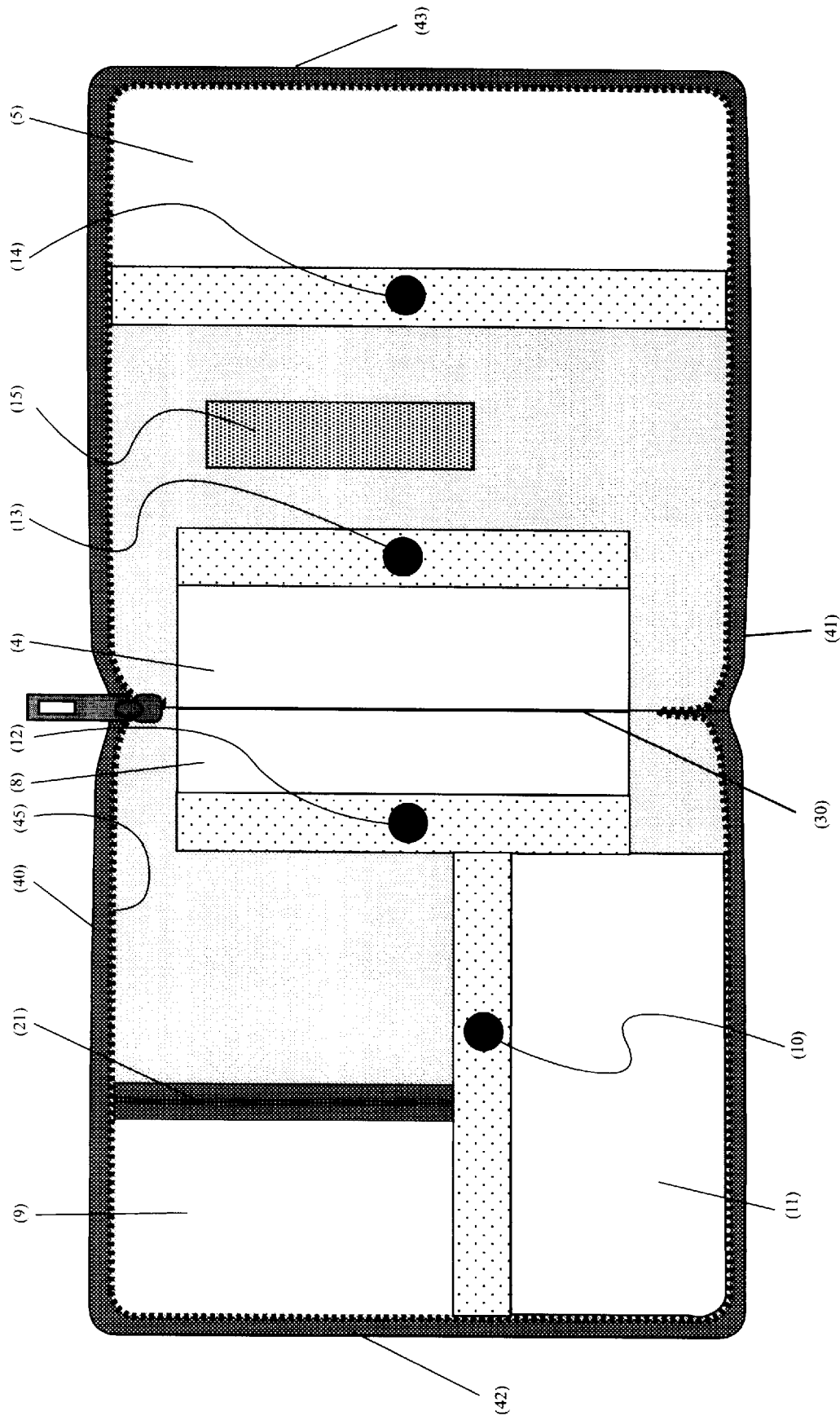
FIG. 2 is a plan view of a first preferred embodiment of the present invention in an open configuration, showing the arrangement of pockets.

Next referring to FIG. 2 and FIG. 3A, the new storage and organizing assembly and system pack assembly 20 constructed in accordance with the principles of the present invention is shown in its open configuration, top side up, showing the arrangement of pockets, closures and fasteners arrayed on, and fastened to, a main body of the pack. FIG. 2 and FIG. 3A show a top edge 40 of the main body of the pack assembly, a bottom edge 41 of the main body of the pack, a left edge 42 of the main body of the pack, and a right edge 43 of the main body of the pack. The pockets, in this preferred embodiment, are formed of stretchable, elastic material, while the edges of the pockets are bordered with a stronger, inelastic webbing.

In FIG. 2, the individual elements of pockets, closures and fasteners include a pocket 11, approximately 6¾ inches long by approximately 3¾ inches wide, intended to hold a computer mouse and mouse cord (the "mouse pocket"), a snap closure 10 for holding the mouse pocket in a closed position, a zippered pocket 9, approximately 6 inches long by approximately 4¼ inches wide, intended to hold spare cables, dongles and peripherals (the "accessory pocket"), a zipper 21, running the entire length of the accessory pocket, for closing the accessory pocket, a pocket 5, approximately 9¾ inches long by approximately 3¾ inches wide, intended to hold that portion of a power cord intended to run from a wall outlet to a power converter (the "first power cord pocket"), a snap closure 14 for holding the first power cord pocket in a closed position, a pocket 4, approximately 9¾ inches long by approximately 2¾ inches wide, intended to hold that portion of a power cord intended to run from a power converter to a computer (the "second power cord pocket"), a snap closure 13 for holding the second power cord pocket in a closed position, a pocket 8, approximately 9¾ inches long by approximately 2¾ inches wide, intended to hold a telephone line with connectors (the "telephone line pocket"), a snap closure 12 for holding the telephone line pocket in a closed position, a "velcro"-type fabric fastener 15, approximately 4 inches long by approximately 1½ inches wide, attached to the pack assembly 20 at a point approximately midway between the first power cord pocket 5 and the second power cord pocket 4, intended to serve as a fastener for a power block or power converter (the "power block lockdown"), a fold line 30 approximately half way between the left edge 42 of the pack assembly 20, and a right edge 43 of the pack assembly 20, and a zipper 45 with zipper clasp 46 intended to hold the entire pack in a closed position during travel. The entire pack occupies a space approximately 20 inches long by 9¾ wide when laid flat as depicted in FIG. 2 and FIG. 3A.

By referring to FIG. 3A in detail, the new utility of the pack assembly constructed in accordance with the principles of the present invention may be better appreciated. In FIG. 3A, the mouse cord pocket 11 is shown holding both a mouse 60 and mouse cord 61. Further, a mouse pocket cord channel 1 is shown, which channel allows a mouse cord to extend from the mouse pocket toward the bottom edge 41 of the pack 20. The preferred position for the mouse pocket cord channel 1 is at the corner of the mouse pocket nearest the bottom edge 41 of the pack, and nearest the fold line 30 of the pack. In such position, a mouse cord connector 52 may be positioned generally near the bottom edge of the pack near its fold line. The snap closure 10 for holding the mouse pocket 11 in a closed position is closed in FIG. 3A, a mouse 60 is positioned in the mouse pocket 11, and a mouse cord 61 is coiled within the mouse pocket. Thus, the mouse and its cord are securely situated in the pack, with the mouse cord connector 52 of the mouse cord positioned near the center of the bottom edge of the pack.

Also in FIG. 3A, the accessory pocket 9 is shown holding an ethernet PCMCIA dongle 59, although the accessory pocket may also hold spare connectors, peripherals, and other equipment. The presence of the accessory pocket 9 insures a place in the pack assembly for a number of oftentimes necessary components, and reduces the possibility of their loss.

Also in FIG. 3A, the first power cord pocket 5 is shown along with a portion of a power cord 57 which runs from a wall power outlet to a power converter. While the first power cord pocket 5 is securely closed in FIG. 3A by a snap closure 14, the power cord with plug 57 extends from the first power cord pocket, around the snap closure 14, and toward the top edge 40 of the pack assembly 20. The snap closure is closed in FIG. 3A, a power cord 68 is positioned in the first power cord pocket, and the remainder of the power cord 63 is gathered within the first power cord pocket. Thus, the power cord is securely situated in the pack assembly 20, with the power cord plug 57 accessible and extendable.

Also in FIG. 3A, the second power cord pocket 4 is shown holding that portion of the power cord intended to run from the power converter 56 to the computer. Further, a second power cord pocket cord channel 3 is shown, positioned near the bottom edge 41 of the pack 20, which channel allows a portion of the power cord 63 to extend from the second power cord pocket 4 toward the bottom edge of the pack, with the power cord connector 54 generally near the fold line 30 of the pack. The snap closure 13 for holding the second power cord pocket in a closed position is closed in FIG. 3A, and a portion of the power cord 63 is gathered and positioned within the second power cord pocket 4. Thus, the portion of the power cord intended to run from the power converter 56 to the computer is securely situated in the pack assembly 20, with the connector 54 of the cord positioned near the center of the bottom edge 41 of the pack. The preferred placement of the second power cord pocket 4 is near the central fold line 30, and positioned parallel with the fold line, with the main opening of the pocket directed away from the fold line. Another second power cord pocket cord channel 6 is shown in FIG. 3A at the top edge 40 of the pack 20.

Also in FIG. 3A, the telephone line pocket 8 is shown holding a telephone line 62, with telephone plug 53 and telephone plug 58 attached thereto, intended to run from a wall-mounted telephone jack to the computer. Further, a telephone line pocket cord channel 2 is shown, formed and positioned at the end of the telephone line pocket 8 near the bottom edge 41 of the pack 20, which channel allows a portion of the telephone line to extend from the telephone line pocket toward the bottom edge 41 of the pack 20, with the telephone plug 53 residing generally near the fold line 30 of the pack 20. Further, a telephone line pocket cord channel 7 is shown, formed and positioned at the end of the telephone line pocket 8 near the top edge 40 of the pack 20, which channel allows a portion of the telephone line to extend from the telephone line pocket toward the top edge 40 of the pack 20, with the telephone plug 58 residing generally near the fold line 30 of the pack 20. The snap closure 12 for holding the telephone line pocket in a closed position is closed in FIG. 3A, a telephone line 62 is positioned in the telephone line pocket 8, with one end of the line and the plug 53 extending from the bottom edge 41 of the pack 20, and the other end of the line and the plug 58 extending from the top edge 40 of the pack 20, and the telephone line is gathered within the telephone line pocket 8. Thus, the telephone line 62 is securely situated in the pack assembly 20, with each of its ends extending from opposite sides of the pack. The preferred placement of the telephone line pocket 8 is near the central fold line 30, and positioned parallel with the fold line, with the main opening of the pocket directed away from the fold line.

With the above arrangement of pockets and cord channels, all cords and connectors intended to run from the pack assembly to the computer are directed through the cord channels of their respective pockets, while allowing the user to gather the excess of cord or connector, if any, within the pocket allocated to each cord or connector. Since cord channels are sized to fit closely around their respective cord or connector, cords and connectors are secured in their optimal positions during use.

Also in FIG. 3A, a power converter 56, or "power block," is shown attached by a single "velcro"-type fabric fastener 15 to the pack 20 at a point about midway between the fold line 30 and the right edge of the pack 43. The presence of this fastener provides a means for holding a power converter at a point in the pack such that the converter does not contact other components held by the pack upon its closure.

By referring to FIG. 3B, the new utility of the pack 20 constructed in accordance with the principles of the present invention may be better appreciated. In FIG. 3B, the new storage and organizing assembly and system pack 20 constructed in accordance with the principles of the present invention is shown, in use, in a closed configuration 17, as it would be configured during use if the user wished to save desktop space. The pack 17 in such configuration displays the same aspect as if it were folded for travel, however the group of cords and connectors 66 intended to be plugged into wall power outlets and telephone jacks (explained in further detail in FIG. 3A extend from the center of the top edge 40 of the pack. In this configuration, the ends of the power cord and telephone line intended for engagement with a power outlet or telephone jack may be directed efficiently to the wall. Through such use of the present invention, the user will utilize the minimum length of cord or connector necessary to reach the wall, while maintaining a significant portion of each cord or connector within the pocket allocated for that cord or connector within the pack assembly.

In addition, the group of cords and connectors intended to be plugged into the computer 64, and the cord which extends to the mouse 65, all extend from the center of the bottom edge 41 of the pack 20. In this configuration, the end of the power cord 63 with plug 54 and telephone line 62 with plug 53 intended for engagement with the computer 65 may be directed efficiently to the computer, while the mouse and mouse cord may be deployed through the mouse pocket opening and mouse pocket cord channel to the vicinity of the computer.

The user initially sets up the new storage and organizing assembly and system pack constructed in accordance with the principles of the present invention by feeding the end of a mouse cord through the cord channel at the base of the mouse pocket, and fixing a set length of the mouse cord from the pack to the computer. Similarly, the user feeds the end of a telephone line through the cord channel at the bottom edge of the telephone line pocket, and fixing a set length of the telephone line from the pack to the computer. Similarly, the user feeds the end of a power cord through the cord channel at the bottom edge of the second power cord pocket, and fixes a set length of the power cord from the pack to the computer. Finally, the user attaches the computer power converter to the power converter lockdown located between the first and second power cord pockets. The excess of each cord or connector is then gathered or folded within its respective pocket. When arrayed in this fashion, the ends of each cord may be folded back into the pack, and the pack closed for travel.

In use, the mouse may be pulled out of the mouse pocket and extended to a position near the vicinity of the computer, the excess unused mouse cord remaining in the mouse pocket. Similarly, the end of the telephone line near the top edge of the pack may be pulled from the cord channel at the end of the telephone line pocket near the top edge of the pack to accommodate varying lengths of phone line required to engage a wall-mounted telephone jack. Similarly, the plug end of the power cord may be pulled from the first power cord pocket near the top edge of the pack to accommodate varying lengths of power cord required to engage a wall-mounted power outlet. Similarly, the ends of the mouse cord, the power cord, and the telephone line near the bottom edge of the pack intended for engagement with the computer set close by may be pulled from their respective cord channels a minimal length to engage the computer, the cord channels thereafter holding each cord or connector in such optimal position, and the pockets of the pack holding excess cord or connector.

Through such setup and use of the present invention, the user will reduce the amount and length of cord trailing free simply because all cords lengths between the pack and the computer may be set to, and kept at, their shortest usable length. The user, by establishing the relationship between the pack and the computer, and extending cords, lines, plugs and connectors toward engagement with outlets and jacks, will create a highly efficient system, with compact interface 67 between the computer and those cords and connectors intended to engage the computer, with easily extendible cord and connectors between the organizing pack of the present invention and power and telephone services located in wall outlets and jacks.

In summary, the present invention enables users having a portable, "laptop," "notebook," or even standard size desktop computer, to carry and organize cords, cables, mice, power converters, and other computer associated equipment. In use, the invention provides an organizational system which comprises the gathering of cords and connectors into a convenient group, the placement of that group in relation to the computer so as to minimize cord lengths, clutter, and required desk space, and the packing and unpacking for transportation of a computer, with its associated equipment, with the least expenditure of time and energy, while minimizing the risk of misplacing or damaging necessary components during travel. The invention disclosed herein also provides a device for accomplishing each of these beneficial results, while reducing the size and weight of the device, and while allowing the device to fit easily into a standard size computer case or bag for easy integration with the user's usual travel gear.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A computer connector storage and organizing pack comprising:
   a foldable main body, having a right edge, a left edge, a top edge, a bottom edge, and a center line between the right edge and the left edge;
   means for securing a power converter to the main body;
   a first pocket attached to the main body near the power converter securing means, the first pocket formed to create an enclosure sufficiently large to hold a computer power cord, the first pocket having an opening;
   a second pocket attached to the main body approximately midway between the right edge of the main body and the left edge of the main body, the second pocket formed to create an enclosure sufficiently large to hold a telephone line, the second pocket having a first opening situated near the center line of the main body and
   near the top edge of the main body, the second pocket having a second opening situated near the center line of the main body and near the bottom edge of the main body, the second pocket having a third opening; and
   a third pocket attached to the main body, the third pocket formed to create an enclosure sufficiently large to hold a computer mouse and a computer mouse cord, the third pocket having a first opening situated near the center line of the main body and near the bottom edge of the main body, the third pocket having a second opening.

2. The computer connector storage and organizing pack described in claim 1, wherein the first, second, and third pockets are composed of flexible material.

3. The computer connector storage and organizing pack described in claim 2, wherein the opening of the first pocket is formed to fit snugly around a computer power cord, and the first and second openings of the second pocket are formed to fit snugly around a telephone line, and the first opening of the third pocket is formed to fit snugly around a mouse cord.

4. The computer connector storage and organizing pack described in claim 3, further comprising means for closing the third opening of the second pocket, and means for closing the second opening of the third pocket.

5. The computer connector storage and organizing pack described in claim 4, further comprising a fourth pocket, having an opening, attached to the main body of the pack.

6. The computer connector storage and organizing pack described in claim 4, wherein the main body is comprised of at least two layers of flexible material.

7. The computer connector storage and organizing pack described in claim 4, wherein the main body is formed of flexible material.

8. The computer connector storage and organizing pack described in claim 4, further comprising means for fastening the main body in a closed position upon its folding.

9. The computer connector storage and organizing pack described in claim 8, wherein the main body of the pack is sized to fit into a compartment of a computer traveling case.

10. A system for storing and organizing computer connectors comprising:
    packing a plurality of computer connectors on a plurality of predetermined areas of a single organizing unit;
    maintaining excess lengths of the computer connectors on the predetermined areas of the organizing unit while traveling and while working on a computer;
    extending the computer connectors from the organizing unit, through holding means, a minimum distance from one side of the organizing unit to the computer;
    extending the computer connectors from a second side of the organizing unit to receptacles for power and telephone service;
    working on the computer with the connectors extending from the computer, through the holding means of the organizing unit, to the receptacles;
    retracting the connectors after working on the computer to the predetermined areas of the organizing unit; and
    closing the organizing unit, with the computer connectors contained therein.

11. The system for storing and organizing computer connectors described in claim 10 further comprising inserting the organizing unit into a compartment of a computer traveling case.

* * * * *